Feb. 17, 1970 R. J. ZISKAL 3,495,850
SERVICE CART
Filed Aug. 19, 1968

INVENTOR.
Robert J. Ziskal
BY
His Att'ys

United States Patent Office 3,495,850
Patented Feb. 17, 1970

3,495,850
SERVICE CART
Robert J. Ziskal, Chicago, Ill., assignor to Illinois Tool Works, Inc., Chicago, Ill., a corporation of Delaware
Filed Aug. 19, 1968, Ser. No. 753,510
Int. Cl. E06c 5/38; E60r 3/02
U.S. Cl. 280—47.34    5 Claims

ABSTRACT OF THE DISCLOSURE

A service cart with front and rear supporting wheel means having a combination cart kickstand and step support attachment, which causes disengagement of one of the front and rear wheel support means while disposing the step support in position for use by the cart user.

---

In certain applications in the construction industry portable automatic screwdrivers are used to drive screws which attach wallboard or other panels to the wall and ceiling skeleton structure of a building. In such cases there has been a need for a service cart which not only carries the screwdriver, miscellaneous equipment therefor, and a quantity of screws for use, but the service cart must also have associated therewith a stepladder, which enables the user of the cart to stand thereupon while mounting wallboard to the walls and ceilings in a building. It is important that the service cart be maintained in a stationary position while supporting the user, and thus it is necessary to disengage at least some of the supporting wheels while at the same time providing an easy-to-mount and stable structure, which supports the weight of a user who finds it necessary to stand upon the cart.

It is one object of the present invention to provide a service cart which provides the double function of carrying equipment and providing a stepladder.

Most specifically, it is an object of the present invention to provide a stepladder cart having a combination kickstand and step supporting attachment which provides for an individual without movement of the cart.

Other objects of the present invention are to provide a stepladder cart which, in addition to the above, is simple in construction, easy to operate, durable in use and in its life, and is otherwise well adapted for the purposes intended.

These and other objects and advantages of the present invention are attained by the provision of a service cart which includes a cart body, supporting wheel means mounted on the base of the cart body at the front and rear ends thereof, the rear supporting wheel means being smaller in diameter than the front supporting wheel means to cause inclination of the cart body during movement thereof, and a combination kickstand and step support attachment including a platform pivotally mounted to the sides of the cart body adjacent the rear end thereof, a leg element pivotally mounted to the platform adjacent its free end and being arranged for pivotal movement below the rear end of the cart body, the leg element also being capable of engaging and raising the rear end of the cart body when the free extremity thereof rests upon a supporting surface for elevating the rear supporting wheel means off of the supporting surface while disposing the platform in a substantially horizontal position to provide a step support for the cart body.

Reference is now made to the accompanying drawing wherein.

Figure 3:
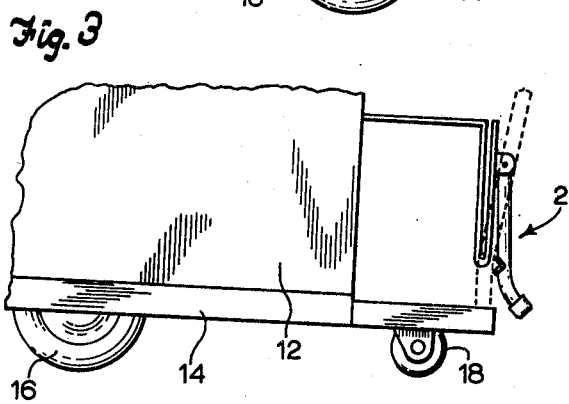
FIG. 3 is a fragmentary side elevational view of the service cart shown in FIG. 1 with the combination kickstand and step support attachment being folded against one of the sides of the service cart.

The service cart 10 illustrated in the drawing includes a cart body 12 which is capable of carrying portable equipment, products to be used, etc. The cart body is mounted upon a supporting base 14, to which are mounted by any suitable wellknown techniques, front and rear wheel supports 16, 18 respectively. Preferably, each of the front and rear wheel supports 16, 18 includes a pair of spaced wheels, which support opposite sides of the cart body 12 at the front and rear ends thereof. It will be noted that the rear support wheels 18 are substantially smaller than the front wheel supports 16 so that the cart will be inclined, as seen in FIG. 3, during movement thereof. To facilitate manual movement of the service cart 10, a pair of hand rails 20 are provided at opposite ends of the cart and extend along opposite sides of the cart body 12 and across the top thereof as best seen in FIGS. 1–2.

As an important feature of the present invention, the service cart 10 is provided with a combination kickstand and step support attachment, which is generally identified by numeral 22 in the various figures of the drawing. The combination kickstand and step support attachment 22 is preferably mounted to a stationary step 24, which is attached to one side of the cart body 12 and to the upper surface of the supporting base 14. This will provide a series of steps to enable the user of the cart to stand on the top surface 26 of the cart body 12 after successively using the step support of the attachment 22 and the stationary step 24.

Figure 4:
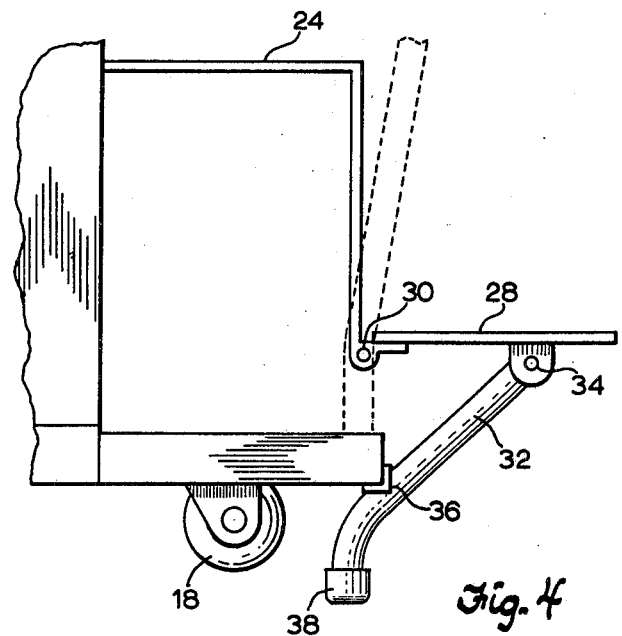
FIG. 4 is an enlarged fragmentary side elevational view of the combination kickstand and step support attachments for the service cart.

As best seen in FIG. 4 of the drawing, the combination kickstand and step support attachment includes a platform 28, which is pivotally mounted as at 30 to the stationary step 24, the attachment also including a pair of spaced leg elements 32, which are themselves pivotally mounted as at 34 to the platform 28 adjacent its free end. As depicted in FIG. 4 of the drawing, each of the leg elements 32 are adapted to be pivotally located below the rear end of the service cart for engaging and raising the rear end thereof to elevate the rear support wheels 18 from the floor or surface on which the service cart is being used. Each of the leg elements 32 have a notched portion 36, which is complementary to the corner construction of the rear end of the service cart to aid in supporting the service cart in the raised or elevated position as illustrated in FIG. 4.

Figure 1:
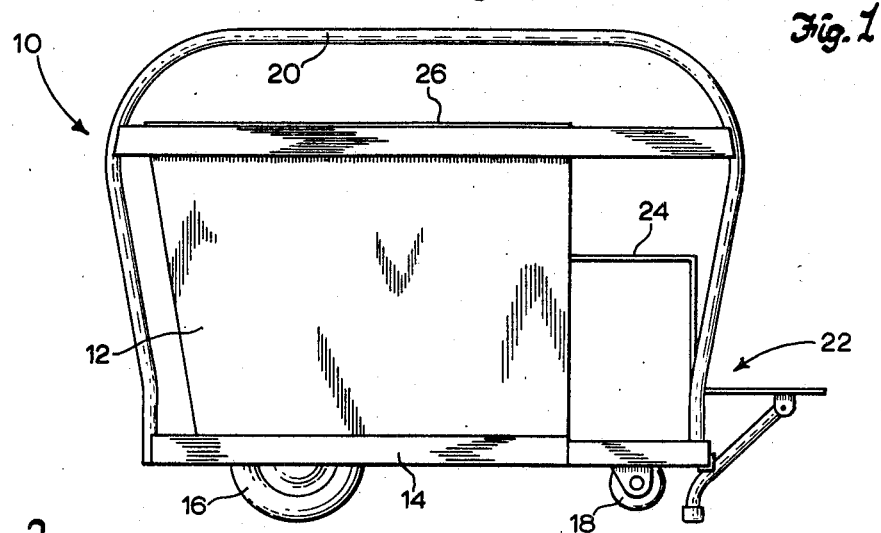
FIG. 1 is a side elevational view of the service cart, including the combination kickstand and step support attachment, which is constructed in accordance with the teachings of the present invention.
Figure 2:
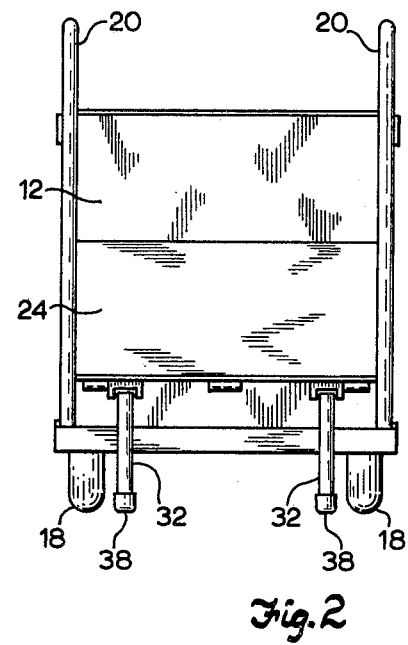
FIG. 2 is an end elevational view of the service cart shown in FIG. 1.

When the leg elements 32 elevate the rear end of the service cart 10, of the supporting base 14, and the cart in general, will be leveled as illustrated in FIG. 1 so that the cart user may mount the steps thereof. Additionally, the weight of the cart, coupled with the use of rubber feet 38 at the free extremity of the leg elements 32 will prevent movement of the cart when the steps thereof are put to use.

During movement of the service cart, the combination kickstand and step support attachment can be mounted as shown in FIG. 3 against the stationary step 24 of the cart. Suitable means may be used to retain the attachment 22 in the position shown in FIG. 3 as may be desired.

From the foregoing, it will now be appreciated that the present invention provides a combination equipment and part transporting as well as a stepladder cart, which makes an extremely functional cart for commercial use.

What is claimed is:

1. A service cart comprising, a cart body, supporting wheel means mounted on the base of the cart body at the front and rear ends thereof, the rear supporting wheel means being smaller in diameter than the front supporting wheel means to cause inclination of the cart body during movement thereof, and a combination kickstand and a step support attachment including a platform pivotally mounted to the side of the cart body adjacent the rear end thereof, a leg element pivotally mounted to the platform adjacent its free end and being arranged for pivotal movement below the rear end of said cart body, said leg element also being capable of engaging and raising the rear end of said cart body when the free extremity thereof rests upon a supporting surface for elevating the rear supporting wheel means off of the supporting surface while disposing said platform in a substantially horizontal position to provide a step support for the user of the cart body.

2. The service cart as defined in claim 1 wherein the platform and leg elements are capable of being juxtaposed adjacent one another in substantially parallel relationships against the side of the cart body during wheeled movement thereof.

3. The service cart as defined in claim 1 wherein the combination kickstand and step support attachment is mounted to an integral step provided in the service cart.

4. The service cart as defined in claim 1 wherein there is a pair of spaced leg elements cooperatively supporting the rear end of the cart body and the platform.

5. The service cart as defined in claim 1 wherein each leg element has a notched portion which is complementary in shape to and which receives the corner construction at the rear end of the cart body.

References Cited

UNITED STATES PATENTS

| 522,117 | 6/1894 | Humphrey | 280—47.2 XR |
| 2,897,910 | 8/1959 | Steely et al. | 182—15 |

BENJAMIN HERSH, Primary Examiner

LESLIE J. PAPERNER, Assistant Examiner

U.S. Cl. X.R.

182—15; 280—150.5, 164